US010772456B2

(12) United States Patent
Duvall

(10) Patent No.: US 10,772,456 B2
(45) Date of Patent: Sep. 15, 2020

(54) DEVICE AND SYSTEM FOR BREWING INFUSED BEVERAGES

(71) Applicant: Gideon Duvall, Atlanta, GA (US)

(72) Inventor: Gideon Duvall, Atlanta, GA (US)

(*) Notice: Subject to any disclaimer, the term of this patent is extended or adjusted under 35 U.S.C. 154(b) by 0 days.

(21) Appl. No.: 16/383,607

(22) Filed: Apr. 13, 2019

(65) Prior Publication Data

US 2019/0261806 A1    Aug. 29, 2019

Related U.S. Application Data

(60) Division of application No. 15/845,946, filed on Dec. 18, 2017, now Pat. No. 10,258,187, which is a continuation of application No. 14/421,362, filed as application No. PCT/US2013/055348 on Aug. 16, 2013, now Pat. No. 9,867,491.

(60) Provisional application No. 61/742,688, filed on Aug. 16, 2012.

(51) Int. Cl.
| *A47J 31/24* | (2006.01) |
| *A47J 31/36* | (2006.01) |
| *A47J 31/34* | (2006.01) |
| *A47J 31/30* | (2006.01) |
| *A47J 31/52* | (2006.01) |
| *A47J 31/54* | (2006.01) |

(52) U.S. Cl.
CPC ............... *A47J 31/24* (2013.01); *A47J 31/30* (2013.01); *A47J 31/34* (2013.01); *A47J 31/36* (2013.01); *A47J 31/52* (2013.01); *A47J 31/525* (2018.08); *A47J 31/5251* (2018.08); *A47J 31/5253* (2018.08); *A47J 31/5255* (2018.08); *A47J 31/545* (2013.01)

(58) Field of Classification Search
CPC .. A47J 31/24; A47J 31/36; A47J 31/34; A47J 31/30; A47J 31/545; A47J 31/52; A47J 31/521; A47J 31/525; A47J 31/5251; A47J 31/5253; A47J 31/5255
See application file for complete search history.

(56) References Cited

U.S. PATENT DOCUMENTS 3,314,357 A * 4/1967 Valente .................. A47J 31/24
                                                      99/282
5,584,229 A   12/1996 Anson
5,975,365 A   11/1999 Hsieh
6,240,829 B1   6/2001 McGarrah
(Continued)

*Primary Examiner* — Sean M Michalski
(74) *Attorney, Agent, or Firm* — Mark C. Johnson

(57) ABSTRACT

An infused beverage brewing assembly having a solvent flow management system (SFMS) operably configured to receive a solvent and induce a flow of the solvent through a first solvent conduit and a second solvent conduit, a solvent temperature modulation system (STMS) operably configured to thermally modulate a solvent within the first solvent conduit to join with a solvent in the second solvent conduit to form a resulting solvent conduit with a resulting solvent. The assembly has a brewing chamber in fluid communication with the resulting solvent conduit and for housing a solute disposed to receive the resulting solvent to produce an infused beverage, an outlet for discharging the infused beverage, and a resulting solvent valve operably configured to select a path of the resulting solvent until reaching a desired temperature, thereby enabling resulting solvent delivered to the brewing chamber at a desired temperature.

16 Claims, 6 Drawing Sheets

(56) References Cited

U.S. PATENT DOCUMENTS

| | | | |
|---|---|---|---|
| 7,654,191 B2 | 2/2010 | Greenwald et al. | |
| 8,695,481 B2 | 4/2014 | Carbonini | |
| 2009/0159612 A1* | 6/2009 | Beavis | A47J 31/525 222/52 |
| 2010/0282088 A1* | 11/2010 | Deuber | A47J 31/5255 99/281 |
| 2012/0095616 A1* | 4/2012 | Karlsson | A47J 31/545 700/306 |
| 2012/0234180 A1* | 9/2012 | Cabe | A47J 31/469 99/275 |
| 2013/0220135 A1* | 8/2013 | Aigner | A47J 31/5255 99/285 |
| 2013/0220136 A1* | 8/2013 | De Jong | A47J 27/2105 99/285 |
| 2014/0005834 A1* | 1/2014 | Hoffman | G05B 19/042 700/275 |
| 2014/0034676 A1* | 2/2014 | Verduin | A47J 31/46 222/146.2 |
| 2014/0272025 A1* | 9/2014 | Wheeler | A47J 31/5253 426/231 |
| 2015/0059585 A1* | 3/2015 | Kim | A47J 31/469 99/283 |
| 2015/0082989 A1* | 3/2015 | Besson | G06F 3/04842 99/280 |
| 2015/0223635 A1* | 8/2015 | Mulvaney | A47J 31/56 99/281 |
| 2017/0367518 A1* | 12/2017 | Anthony | A47J 31/0652 |
| 2018/0055275 A1* | 3/2018 | Bianchi | A47J 42/40 |
| 2018/0160846 A1* | 6/2018 | Ceotto | A47J 31/5251 |
| 2018/0199751 A1* | 7/2018 | Mitchell | A47J 31/5253 |

\* cited by examiner

DEVICE AND SYSTEM FOR BREWING INFUSED BEVERAGES

CROSS-REFERENCE TO RELATED APPLICATION

This is a divisional application of U.S. Nonprovisional patent application Ser. No. 15/845,946, filed on Dec. 18, 2018, which was a continuation of U.S. Nonprovisional patent application Ser. No. 14/421,362, filed on Feb. 12, 2015 and patented as U.S. Pat. No. 9,867,491, which was a 371 Nationalized Application of International Serial No. PCT/US2013/055348, filed on Aug. 16, 2013, which claims priority to U.S. Provisional Patent Application No. U.S. 61/742,688, filed on Aug. 16, 2012, the entirety of which is incorporated by reference.

FIELD OF THE INVENTION

The present invention relates to beverage brewing systems that utilize pressure, temperature, and flow of a solvent through a solute.

BACKGROUND OF THE INVENTION

The creation of brewed or infused beverages through the infusion of a solvent with a solute contained within a filter media has been performed for over one hundred years. Over time it has come to be understood that the modification of brewing variables, such as infusion temperature, pressure, and flow rate of solvent through solute, change the resulting beverage's chemical composition and taste. Thus, many brewing systems have been developed that seek to enable flavor modification through selective modulation of one or more brewing variables. However, few, if any, brewing systems facilitate dynamic, i.e., within the brewing cycle, modulation of one or more of these variables during an infusion. Of those that do, modulation of one or more variables during an infusion results in unintended changes to other brewing variables. This lack of independent variable control makes the optimization and modification of infused beverages difficult.

For instance, currently available brewing systems that enable users to modify pressure during an infusion rely on back pressure generated in a brewing chamber by a resistive media typically composed of a filter and solute. In one configuration, brew chamber pressure modification is achieved by modulating the resistance of said resistive solute media while holding pumping energy constant. While this does result in a change in infusion pressure, it also changes the infusion flow rate. In another conventionally available system, the user modifies infusion pressure through the variation of solvent pumping force while keeping the resistance of the resistive media constant. This too results in an increase in infusion pressure and simultaneous change in infusion flow rate. Thus, in conventional systems, the variables of pressure and flow rate during the infusion process are dependent upon each other. As pressure and flow rate are both known to affect the chemical composition of the brewed infusion, there is an apparent need for a brewing system that affords independent modulation of infusion pressure and flow rate enabling the user to optimize infused solution chemical composition and produce consistent beverages.

Some known devices that are configured to modify one or more brewing variables to provide dynamic pressure control, but, again, lack control over flow rate independent of the pressure control. Specifically, said devices enable the user to create and execute brew formulas which modulate brew pressure and temperature with respect to time. This is performed through the use of a pressure sensor to monitor the infusion pressure within a brew chamber and modulating the pumping force of a water pump such that the desired infusion pressure is achieved in the brew chamber. Temperature control of infusion water is performed by utilizing a proportional mixing valve that is controlled by a controller to mix hot and cold water. While the aforementioned device may be capable of providing dynamic temperature and pressure control, it does so at the expense of the ability to regulate flow rate of the exiting infused beverage. The varying exiting flow rate disadvantageously creates inconsistent beverage output, which is costly for many retailers of beverages. The inconsistencies also are problematic for retailers and consumers, alike, as both the taste of the beverage and the amount of the beverage may change at each brewing cycle. Thus, flow rate, total dispensed volume, and ultimately beverage taste are dependent on variables such as fluctuations in solute particle size, packing density, solute quantity, along with filter media resistivity. As such, this makes it highly difficult to duplicate the flavor of an extraction even if the same brew formula of infusion pressure and temperature with respect to time are used.

It is well understood that infusion temperature also affects chemical composition of an infused beverage solution. Thus, an operator may find it advantageous to modify brewing infusion temperature during the brewing process to optimize flavor. Current brewing systems utilize boilers and brewing chambers with large thermal masses that are designed to provide consistent brewing temperature thus prohibiting the use of variable infusion temperatures to create optimal flavor. Therefore, a beverage brewing system that affords precise, accurate and dynamic temperature control would enable optimization of beverage flavor and is needed.

As previously explained, there is an acute need for a brewing system that affords the brewer independent, dynamic variation of brewing variables of temperature, pressure and flow rate during the production of infused beverages. Furthermore, there is a need for a brewing system that mitigates and/or eliminates the impact of external factors such as solute particle size variations and solute compaction on the beverage flavor.

SUMMARY OF THE INVENTION

The present invention relates to a system and method of brewing beverages that satisfies the outlined need, facilitating dynamic, independent control of pressure, temperature and flow rate of solvent through solute contained within a filter during the infusion process. An exemplary brewing system is composed of a Solvent Flow Management System (SFMS) configured such that a desired flow rate is maintained regardless of pressure variations in the brewing chamber or other areas. This SFMS is operably connected to a Solvent Temperature Management System (STMS) that selectively and dynamically modulates (i.e., keep constant or change) the infusion temperature. The STMS is operably connected to a brewing chamber where solute resides within a filtering device and the infusion occurs. Operably connected to the brewing chamber is a Solution Pressure Management System (SPMS) which facilitates dynamic modulation of pressure within said brewing chamber.

Although the invention is illustrated and described herein as embodied in a system and method for brewing beverages with independently controlled flow rate, temperature, and pressure, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

With the foregoing and other objects in view, there is provided, in accordance with the invention, an infused beverage brewing assembly that includes a solvent flow management system operable to receive a solvent and selectively and dynamically modulate a flow of the solvent, a solvent temperature modulation system that is in fluid communication with the solvent flow management system through at least one solvent conduit, the solvent temperature modulation system operable to selectively and dynamically modulate the temperature of the solvent, a brewing chamber for housing a solute disposed to receive the solvent to produce an infused beverage. The brewing chamber is in fluid communication with the solvent temperature modulation system through at least one resulting solvent conduit. The beverage assembly also includes an outlet for discharging the infused beverage and an electronic control system communicatively coupled to, and operable to independently modulate, the solvent flow management system and the solvent temperature modulation system.

In accordance with another feature, an embodiment of the present invention includes an infusion pressure regulation system that is in fluid communication with, and downstream of, the brewing chamber through an infused solution conduit. The electronic control system is communicatively coupled to, and operable to independently, selectively, and dynamically modulate, the infusion pressure regulation system.

In accordance with a further feature of the present invention, the electronic control system is operable to monitor one of a plurality of solvent characteristic variables at a location downstream of the solvent flow management system, the solvent temperature modulation system, and the an infusion pressure regulation system. This may occur through the use of one or more sensors operable receive solvent or infused beverage conditions.

In accordance with yet another feature of the present invention, the electronic control system is operable to independently and dynamically modulate at least one of the solvent flow management system, the solvent temperature modulation system, and the an infusion pressure regulation system after receiving the one of the plurality of solvent characteristic variables. This enables the complete control of the infusion process, which is also not available with known infused brewing assemblies.

In accordance with another feature, an embodiment of the present invention includes an infused beverage formula that includes at least one defined infused beverage parameter corresponding to one of a plurality of solvent characteristic variables. The infused beverage formula is advantageously accessible by the electronic control system, such that the solvent flow management system, the solvent temperature modulation system, or the an infusion pressure regulation system is modulated to adjust the one of the plurality of solvent characteristic variables to correspond to a at least one defined infused beverage parameter. The defined infused beverage parameter may include flow rate, temperature, dispensed volume, etc.

Also in accordance with the invention, an infused beverage brewing assembly is provided that includes a solvent flow management system operable to receive and convey a solvent, a solvent temperature management system that is in fluid communication with the solvent flow management system. The solvent temperature system is operable to modulate the temperature of the solvent. The infused beverage brewing assembly also includes a brewing chamber for housing a solute disposed to receive the solvent to produce an infused beverage resulting from an infusion process, the brewing chamber being in fluid communication with either the solvent flow management system or the solvent temperature management system. The infused beverage brewing assembly additionally includes an infusion pressure regulation system that is at least partially located downstream of the brewing chamber and an outlet for discharging the infused beverage. The outlet is in fluid communication with the brewing chamber and the infusion pressure regulation system is advantageously operable to selectively and dynamically increase an infusion process pressure beyond/greater than a pressure created upstream in the brewing chamber caused by a flow of the solvent through the solute.

In accordance with a further feature of the present invention, the infusion process pressure is selectively defined. Each parameter may be "defined" to particular value. As such, "defined" entails purposely manifesting a selected value, as opposed to adjusting a parameter without a specific set point guiding the adjustment.

In accordance with another feature, an embodiment of the present invention includes an electronic control system that is operated to monitor and modulate a performance of the solvent flow management system, the solvent temperature management system, and the infusion pressure regulation system such that infusion process parameters of at least one of an infusion temperature, an infusion pressure, an infusion flow rate, a dispensed beverage volume, and an infusion duration are appreciably controlled and dynamically modulated during the infusion process. "Appreciably controlled," as it relates to performance of the brewing system, is defined as being controlled to a minimum extent that said control is capable of making a quantifiable difference in the end result or effect over having no purposeful control.

In accordance with an additional feature of the present invention, the infusion temperature with respect to the dispensed beverage volume, the infusion pressure with respect to the dispensed beverage volume, and the infusion duration with respect to the dispensed beverage volume are stored in data storage medium for recall and replication through the electronic control system. In alternative embodiments, the infusion temperature with respect to the infusion duration, the infusion pressure with respect to the infusion duration, and the dispensed beverage volume with respect to the infusion duration are stored in data storage medium for recall and replication through the electronic control system.

In accordance with an additional feature of the present invention, the solvent flow management system is controlled by a programmable logic controller capable of selectively and dynamically modulating solvent flow at a defined preprogrammed rate. Further, the solvent temperature management system may also be controlled the programmable logic controller and operable to provide the solvent to the brewing chamber at a defined dynamically adjustable temperature during the infusion process.

In accordance with yet another feature of the present invention, the programmable logic controller modifies a plurality of pumping rates of solvents of different temperatures such that their sum flow rate, sum temperature, and sum pumped volume is equivalent to that desired by a user.

In accordance with a further feature of the present invention, the solvent temperature management system is operable to provide solvent to the brewing chamber at a minimum temperature range of approximately 50° C. to 100° C., with a change in temperature at a minimum rate of approximately at least one of 10° C./s and 10° C./mL.

In accordance with a further feature of the present invention, the infusion pressure regulation system operates to increase and decrease the infusion process pressure at a minimum rate of approximately 1 bar/s, in addition to being operable to provide either a minimum increase of 5 bar greater than the pressure created upstream in the brewing chamber caused by the flow of the solvent through the solute or an infusion process pressure of at least 10 Bar.

In accordance with another feature, an embodiment of the present invention includes a recirculation conduit, wherein the solvent downstream of the solvent temperature management system is selectively re-circulated through the solvent temperature management system prior to entering the brewing chamber.

In accordance with a further feature of the present invention, the solvent flow management system and the solvent temperature management system are inseparable in that the solvent flow management system conveys a minimum of two fluids of different temperatures and rates which, when combined, produce a resulting solvent at a desired temperature and a desired flow rate.

In accordance with another feature, an embodiment of the present invention includes a solute modification system communicatively coupled to the electronic control system, the solute modification system is operable to adjust either the solute particle size, through an electronic grinder, or the solute compaction, through a compaction tool, e.g., a press. Said modification is configured to ensure consistent flavor of brewed beverages by modifying solute resistivity to ensure formula specified parameters are manifested during a brew. Additionally, it may be configured to further ensure consistency of flavor by monitoring SPMS performance during execution of a brew formula and modifying the amount of solute resistance to maintain equal SPMS performance for each execution of a brew formula. For instance, if a brewing system is executing the same brew formula multiple times in a row and finds that SPMS has to increase the amount of back pressure it adds in relation to previous infusions, solute modification system will increase amount of resistance provided by solute during the infusion by decreasing size of solute particles and/or increasing the compaction of solute particles such that future infusions require SPMS to modify pressure to the same extent as an earlier brew formula execution or as specified within the brew formula. As will be understood by those skilled in the art, adjustment of said solvent modification system may be performed in an automated fashion controlled by an algorithm such as a proportional integral derivative algorithm.

In the instance of a beverage brewing system having only SFMS, STMS coupled to a brew chamber, a pressure sensor monitoring infusion pressure may be utilized to track variances in generated infusion pressure for the same brew formula. Said variances may be processed by a control system which modifies performance of a communicatively coupled solute modification system which may modify particle size and/or compaction as previously described in order to maintain a specified infusion pressure. In accordance with a further feature, the present invention also discloses a system for creating an infused beverage, the system including (1) a solvent flow management system configured to flow a solvent through a plurality of conduits in an infused beverage assembly, (2) a solvent temperature modulation system configured to modulate the temperature of the solvent, (3) a brewing chamber in which infusion of a solute and the solvent occurs to generate an infused beverage, the brewing chamber having an infusion process pressure and in fluid communication with at least one of the solvent flow management system and the solvent temperature modulation system, (4) an infusion pressure regulation system at least partially located downstream of the brewing chamber, the infusion pressure regulation system configured to selectively define and dynamically increase the infusion process pressure greater than a pressure created upstream in the brewing chamber caused by a flow of the solvent through the solute, and (5) an outlet for discharging the infused beverage.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The word "system," as used herein, is defined as one or more devices or components that form a network for performing or distributing something or operating for a common purpose. The word "correspond" or its equivalent is defined as being similar or equivalent in character, quantity, origin, structure or function As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
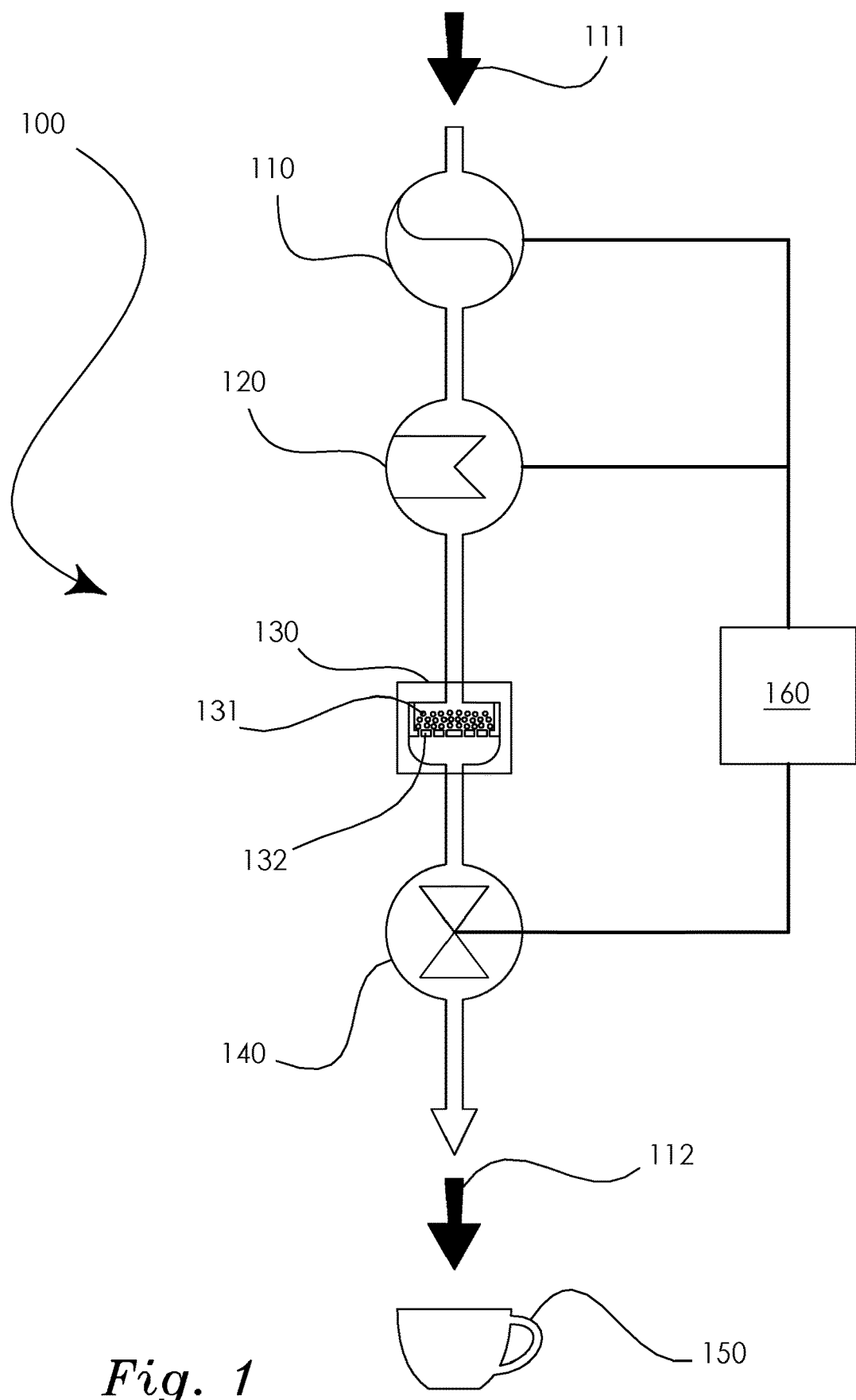
FIG. 1 is a schematic diagram depicting an independently controlled beverage brewing system in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Although the invention is illustrated and described herein with reference to specific embodiments, the invention is not intended to be limited to the details shown. Rather, various modifications may be made in the details within the scope and range of equivalents of the claims and without departing from the invention.

With reference to FIG. 1, a schematic diagram depicting an exemplary brewing system 100 is shown. The brewing system 100 includes a solvent flow management system "SFMS" 110, operably connected to a solvent temperature management system "STMS" 120. The STMS 120 is operably connected to the brewing/infusion chamber 130. The infusion chamber 130 is operably connected to a solution/infusion pressure management/regulation system "SPMS" 140. In operation, a solvent 111 enters the SFMS 110 where it is pumped at a chosen and selectively modulated rate throughout system 100. It can be appreciated by those skilled in the art that the brewing system 100 operates normally under conditions of constant flow (i.e., movement) through the solvent conduits. The term "conduit" is defined as any channel through which something is conveyed. In one embodiment, the conduit may start and terminate where it enters and leaves, respectively, from one component to another within the brewing system 100. In other embodiments, the conduit may start at the beginning of the infusion process (e.g., SFMS) and may terminate at the end of the infusion process (e.g., outlet). The solvent 111 then enters the STMS 120 where it is selectively, whether manually by a user or automated with a control system, thermally modulated to a chosen temperature. Subsequently, the solvent 111 enters the infusion chamber 130 where it comes in contact with the solute 131, thereby creating an infused solution 112. The "infused solution" may be considered any mixture of a single or multi-phase liquid substance. Particulate matter may be removed via a filter 132. The infused solution 112 passes through a SPMS 140. The SPMS 140 selectively modulates the infusion pressure in infusion chamber 130. The infused solution 112 is then dispensed into container 150.

According to another embodiment, the control system 160 is used to independently and automatically monitor and or modify solvent characteristic variables including, but not limited to, flow rate, temperature and pressure of the infusion in accordance with the user-programmed specifications. The control system 160 is operable to modify the flow rate of solvent 111 by accordingly adjusting the SFMS 110. Additionally, control system 160 modulates solvent temperature through modulating STMS 120. Furthermore, the control system 160 may also adjust the pressure of the infusion by adjusting SPMS 140. During an infusion process, one or more of the aforementioned infusion parameters may be selectively modified during said infusion. This dynamic modification of said variables may be utilized to modify chemicals and/or dissolved solids infused into the resulting solution 112 producing a preferred beverage customizable by the user.

The parameters required to produce said preferred beverage may be created by a user remotely or on-site. Furthermore, said parameters may be stored as programs or brewing formulas in the control system 160, via a memory, and then may be recalled as desired to reproduce the preferred beverage. The control system 160 may be programmed to provide optimal infusion for numerous solutes or multiple preferred infusions with the same solute. As will be understood by those skilled in the art, to ensure accuracy and precision during the infusion process, feedback sensors, not shown, such as thermocouples, pressure meters, and flow meters may be positioned throughout brewing system 100. These sensors prove feedback to the appropriate control devices affording them the necessary data to modulate aspects of brewing system 100 to ensure programmed infusion conditions are achieved and maintained with consistency, if desired.

The control system 160 may track performance data such as the number, volume, and/or infusion parameters of infused beverages produced by the brewing system 100. This data may be combined with any recorded system errors or data that could be used to recommend and/or perform system maintenance. Data recorded by control system 160 may be accessed on-site or remotely.

As will be commonly understood, the brewing system 100 may be reconfigured such that SFMS 110 and STMS 120 are reversed such that solvent 111 initially flows into STMS 120, where solvent is thermally modulated to the appropriate or desired temperature. Subsequently, the thermally modulated solvent 111 would enter SFMS 110 then flow into infusion chamber 130. The infusion chamber 130 may be any structural housing wherein a solute is capable of being disposed.

A preferred beverage may be produced by the incorporation of one or more of the dynamically adjustable systems, i.e., the SFMS 110, the STMS 120, and the SPMS 140. Said another way, any of the system 100 components, e.g., SFMS 110, are operable to adjust solvent/infusion parameters during an infusion process. In other embodiments, a beverage may be produced by a brewing system 100 that incorporates a non-dynamically controlled SPMS 140 and a dynamically controlled SFMS 110 and a STMS 120. Alternately, the brewing system 100 may include a non-dynamically controlled SFMS 110 and SPMS 140 and a dynamically controlled STMS 120.

Figure 2:
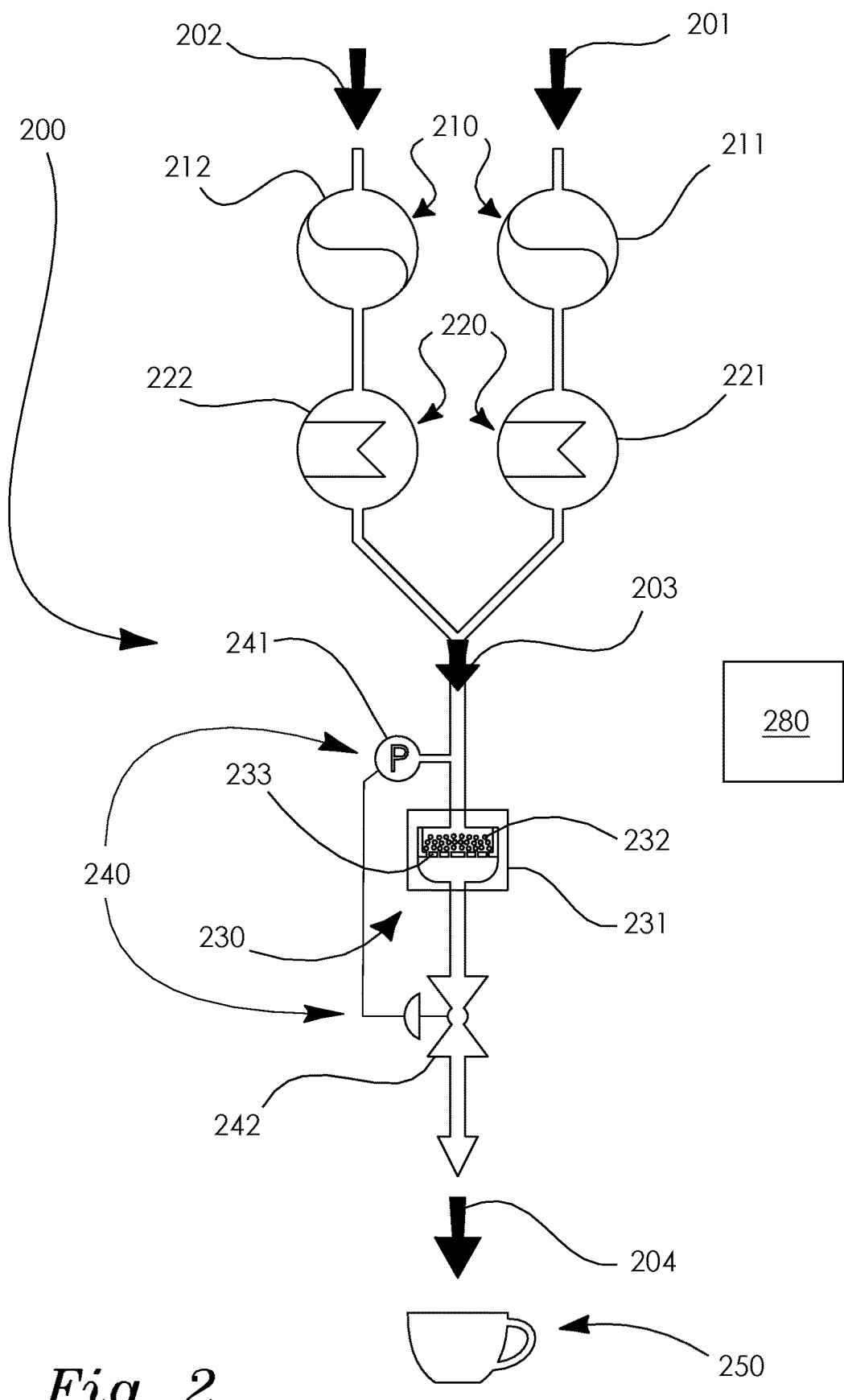
FIG. 2 is a schematic diagram depicting an independently controlled beverage brewing system in accordance with another embodiment of the present invention.

Referring now to FIG. 2, a schematic diagram of a beverage brewing system 200 in an alternate configuration is shown. In said configuration, solvents 202 and 201 are pumped by two SFMS 210, the SMFS being operably connected to two STMS 220. After passing through the STMS 220, the thermally regulated solvents 202 and 201 combine to create a resulting solvent 203 of a resulting temperature. The resulting solvent 203 then passes into the brewing/infusion chamber 230, through a resulting solvent conduit—which may or may not be considered to be the same as a solvent conduit—where infusion of solute 232 and solvent 203 occurs. The result of the infusion of the solute 232 and solvent generates an infused solution 204. The infused solution 204 then passes through an infused solution conduit—which may or may not be considered to be the same as the solvent conduit or resulting solvent conduit—to a SPMS 240 and then exits the assembly through an outlet to a receptacle 250.

In the brewing system 200 shown in the figuration of FIG. 2, the SFMS 210 is composed of independently controlled pumping units 211 and 212, with the pump 212 receiving solvent 202 and the pump 211 receiving solvent 201. Said pumps 211, 212 work in tandem to provide an additive flow rate that is equivalent to the total desired infusion flow rate in the brewing chamber 230. For example, if the desired infusion flow rate is 1 cc/sec, the pump 211 may pump at 0.7 cc/sec and the pump 212 may pump at 0.3 cc/sec. The SFMS 210 may be independently controlled or coupled to control system 280, thereby modulating the pumps 211, 212 to achieve a required flow rate of solvents 201, 202 based on total desired flow rate of resulting solvent 203 and the desired infusion temperature as explained below.

In one embodiment, the SFMS 210 is operably connected to the STMS 220 where the solvent 202 is thermally modulated by a thermal modulator 222 and the solvent 201 is thermally modulated by a thermal modulator 221, such that the range of infusion temperatures desired by the user may be produced through their selective combination. Thermal modulations provided by thermal modulators 221, 222 dictate the solvent temperature range available for an infusion. For example, if a user desires to perform the infusion between 20° C. and 100° C. then thermal modulator 221 may yield solvent 201 at a temperature of 20° C. or lower and thermal modulator 222 may yield solvent 202 at a temperature of 100° C. or higher. In practice, to achieve infusion temperatures within this range, the SFMS 210 will selectively pump solvents 201, 202 through the STMS 220 at a rate that satisfies the desired overall infusion flow rate and temperature of the resulting solvent 203. For example, assuming a negligible thermal loss from the brewing chamber 230 and system conduits, if the user desires an infusion flow rate of 1 cc/sec and an infusion temperature of 90° C., the solvent 201 may be modulated to 100° C. and the solvent 202 may be modulated to 20° C. The pump 212 will flow solvent 202 at a rate of ⅛ cc/sec and pump 211 will flow solvent 201 at a rate of ⅞ cc/sec. In order to improve accuracy of the infusion temperature, the specific heat capacity and thermal conductivity of brewing chamber 230 and system conduits may be accounted for when determining solvents' 201, 202 flow rates. The STMS 220 may also be connected to the control system 280, which may modulate and/or monitor temperature of the respective solvents 201, 202, as necessary. Solvent temperatures and/or data from the STMS may be utilized by control system 280 to modulate the performance of the SFMS, thereby advantageously achieving a desired infusion temperature and infusion flow rate.

The STMS 220 is operably connected to the brewing chamber 230. In one embodiment, the brewing chamber 230 is composed of a chamber housing 231 and a filter system 233 designed to contain a solute 232. The brew chamber housing 231 may be designed with a removable section that readily facilitates the insertion or removal of the solute 232. In order to facilitate rapid, accurate, and dramatic fluctuations in infusion temperatures, the brew chamber 230 is optimally designed with a minimal specific heat capacity and thermal conductivity. Within the brewing chamber 230, the resulting solvent 203 contacts the solute 232 thereby creating a solution 204.

Operably connected to brewing chamber 230 is a SPMS 240 which selectively modulates infusion pressure via the addition of flow resistance generated by at least one pressure regulation component, e.g., a valve 242. As the filter 233 and the solute 232 may create a resistance to flow, a pressure monitoring device 241 is inserted antecedent to the solute 232, the pressure monitoring device 241 operably connected to the solvent 203 to enable accurate infusion pressure measurement. In order to increase infusion pressure (i.e., infusion process pressure) greater than that provided by solute 232 and filter 233, the valve 242 may be selectively activated increasing solution 204 flow resistance thereby increasing infusion pressure. Once activated, the valve 242 may be selectively deactivated, decreasing flow resistance and thus infusion pressure.

As will be understood by those skilled in the art, in order to control the infusion pressure in accordance with the present invention, the valve 242 is of a class that is not activated based on a defined or determined pressure differential across the valve 242, e.g., blowoff valve. Said another way, the valve 242 is such that the flow of the solvent through the solute is not contingent on a pressure differential across the pressure regulation component. Rather, it is activated or utilized to dictate the infusion pressure independent of pressure differential across itself. As such, the at least one pressure regulation component 242 is operably unaffected by a pressure differential across the at least one pressure regulation component during the infusion process. Any other known infusion systems that may utilize a valve downstream, are solely utilizing this valve 242 as a means to relieve pressure in the lines, thereby are always operably affected by a pressure differential across itself. Therefore, the present invention provides a user the advantage of dictating the infusion pressure independent of releasing the infused solution and controlling other system parameters.

In one embodiment, the pressure regulation component, e.g., valve 242, may be a needle valve. In other embodiments, the valve 242 may include a butterfly valve, a globe valve, a pinch valve, or any other flow impeding device capable of regulating pressure within brewing chamber 230. Ideal valves are impervious to particulate matter, oils, and other dissolved solids that may exist in infused solution, possess a minimal internal volume, are readily cleaned, and possess a minimal thermal conductivity and specific heat capacity. In practice, the pressure monitoring device 241 is used to monitor the infusion pressure, which, in turn, modulates the valve 242 to adjust infusion pressure. The SPMS 240 may be connected to a control system 280 which may modulate the valve 242 based on inputs from the pressure monitoring device 241 to achieve a desired infusion pressure. Operably connected to the SPMS 240 is solution receptacle 250 which receives the solution 204 once it exits beverage brewing system 200.

As will be commonly understood, the brewing system 200 may be reconfigured such that SFMS 210 and STMS 220 are reversed such that solvents 201, 202 initially flow into STMS 220 where they are heated to the appropriate temperature, before subsequently entering the SFMS 210, and then flowing into brewing/infusion chamber 230.

According to another embodiment of the present invention, the control system 280 is used to independently and automatically modify flow rate, temperature, and pressure of the infusion. The control system 280 modifies flow rate of solvents 201, 202 by accordingly adjusting the SFMS 210. Additionally, the control system 280 modulates the solvent temperature through modulation of STMS 220. Furthermore, the control system 280 adjusts pressure of the infusion by adjusting SPMS 240. For example, during an infusion process, the control system 280 may selectively modify one or more of the aforementioned infusion parameters in accordance with user's desires. This dynamic modification may be utilized to modify chemicals and/or dissolved solids infused into the resulting solution producing a preferred beverage by the user or a consumer. The parameters required to produce said preferred beverage may be stored as programs or brewing formulas in control system 280 and recalled as desired to reproduce and replicate the preferred beverage formula. As such, the infused beverage formulate may be any recipe or formulation made up of infusion process parameters.

Figure 3:
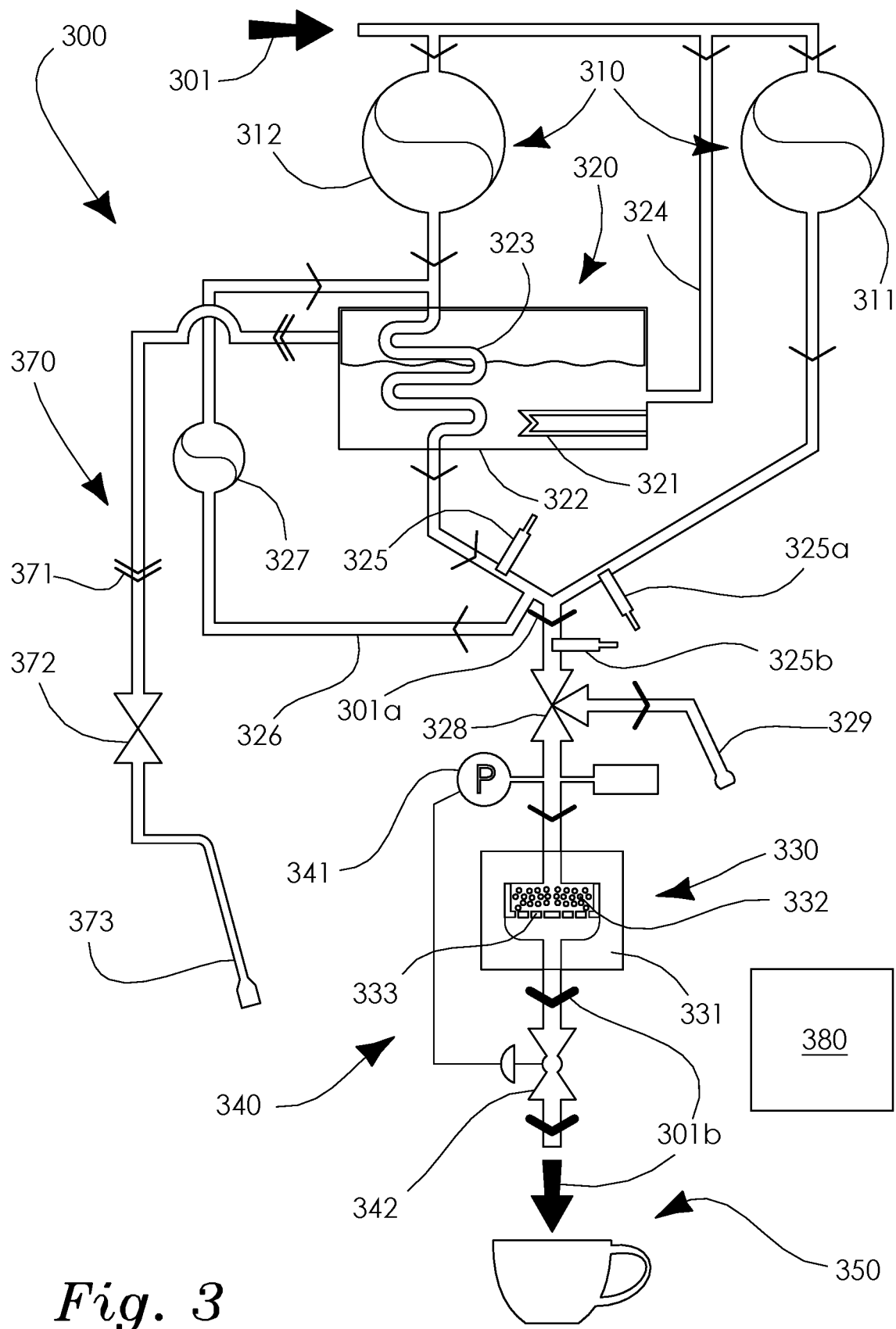
FIG. 3 is a schematic diagram depicting an independently controlled beverage brewing system in accordance with another embodiment of the present invention.

With reference now to FIG. 3, another schematic diagram is shown depicting a beverage brewing system 300 in accordance with an alternate embodiment of present invention. The beverage brewing system 300 is adapted to enable the brewing system to produce infused beverages while also producing steam for frothing beverages and enabling the selective dispensing of thermally modulated solvent without its passage through the brewing chamber.

As shown, the solvent 301 is pumped by SFMS 310, which may include solvent pumps 311, 312, (operable equivalents of solvent pump 211 and 212) and is in fluid communication with the STMS 320. STMS 320 in the present embodiment is configured to selectively thermally modulate one of the solvent flows from the SFMS 310 or other solvent sources, i.e., a boiler. As will be obvious to those skilled in the art, thermal modulation of one solvent dictates that the minimum temperature for an infusion will be that of solvent 301. The STMS 320 is operable to selectively heat the solvent 301 pumped from solvent pumps 311, 312 through the use of a heat exchanger 323. The heat exchanger 323 may be contained within a steam boiler 322 which is heated by a heating element 321 and supplied solvent from a boiler solvent supply line 324.

A solvent recirculation system 326 is preferably in fluid connection with the heat exchanger 323, such that it is connected downstream and upstream the steam boiler 322. The solvent recirculation system 326 is operable to selectively recirculate the thermally modulated solvent 301 in order to maintain an optimal temperature. A solvent recirculation pump 327 may also be utilized to aid in the recirculation of the solvent 301. The temperature of the solvent 301 may be monitored by a temperature measuring device 325. The temperature measuring device 325 may be communicatively coupled to the recirculation pump 327, through the use of a controller 380 or other means, to modulate its performance and maintain a desired temperature and/or a uniform temperature within the solvent conduits. In other embodiments, the temperature measuring device 325 may also be communicatively coupled to a valve downstream of the steam boiler that is operable to inhibit the flow of the solvent until a desired temperature is reached.

The system 300 may also utilize a steam dispensing system 370 that is in fluid communication with steam boiler 322, through use of one or more conduits, and is preferably configured to facilitate in dispensing steam 371. Dispensing of said steam 371 is controlled by a steam valve 372, which is also in fluid communication with the steam boiler 322 and operable to control the flow of the steam 371. The steam dispensing system 370 may also include a steam dispensing nozzle 373 that may be uniquely adapted to dispense steam 371 in a manner which is optimized for the frothing of beverages. As will be obvious to those skilled in the art, the steam boiler 322 is configured to supply steam 371 at a pressure controlled by a pressure switch or alternate equivalent (not shown). The steam boiler 322 may also be configured to maintain a sufficient volume solvent level through the use of a selectively operable fill valve and fluid level switches (not shown).

In an operable equivalent manner to the beverage brewing system 200 depicted in FIG. 2, the thermally modulated solvent 301 pumped by solvent pump 312 may be mixed with the solvent 301 pumped by the solvent pump 311 which has not been appreciably thermally modulated and thus is of a different temperature thereby creating a resulting solvent 301a of a resulting temperature. Depending on the desired temperature and flow rate, the SFMS pumps solvent 301 based on solvent temperatures measured by temperature measuring devices 325 and 325a. The system 300 may also include a temperature measuring device 325b that measures the temperature of the resulting solvent 301a. In one embodiment, the temperature measuring device 325b may provide feedback to a controller 380 that may modify performance of SFMS to ensure the resulting solvent 301a is maintained at the desired temperature. In other embodiments, the temperature measuring device 325b may be communicatively coupled to the heating element 321 or other system 300 components to operably modulate the resulting solvent 301a to a desired temperature.

Flow of the resulting solvent 301a to the brew chamber 330 is preferably controlled by a valve 328 that is operably configured to selectively prevent or inhibit the flow of the resulting solvent 301a, facilitate flow of resulting solvent 301a to the brew chamber 330, facilitate flow of the resulting solvent 301a to an external non-brew chamber location, and/or facilitate flow to a drain (not shown). The valve 328 may be manually operated or automatically operated by a controller 380. In practice, when brewing system 300 is in its default state, the valve 328 is closed thereby preventing or otherwise inhibiting fluid flow. The active state of the system 300 may include, but is not necessarily limited to, when the user desires to dispense a specific temperature and/or volume of resulting solvent 301a without passing the solvent 301a through the brew chamber 330 or desires to pass the solvent 301a through the brewing chamber. Therefore, the active state may include modifying the valve 328 such that the solvent 301a is directed to flow out a dispensing spout 329 with the SFMS and the STMS providing the solvent 301a at the desired temperature, volume, and flow rate. Said independent control of system components is what advantageously gives the user optimum control not available with prior art brewing systems.

Alternately, the valve 328 may direct the solvent 301*a* to a drain (not shown), which will enable the flushing of solvent 301*a* or any gas within the system. The valve 328 may also be utilized to ensure solvent 301*a* is at a desired temperature prior to being directed to the brew chamber 330 for an infusion or dispensing spout 329 for dispensing. This is accomplished by a valve 328 directing solvent 301*a* to a drain until temperature measuring device 325*b* indicates that solvent 301*a* is the proper temperature. In other embodiments, the valve 328 may recirculate the solvent 301*a* to the steam boiler 322 or the recirculation pump 327. When the solvent 301*a* is at the proper temperature then the valve 328 may switch to direct solvent 301*a* to the infusion chamber 330 or dispensing spout 329.

When creating an infusion, i.e., the result of an infusion process, the solvent 301*a* passes through the valve 328 and is directed to the brewing chamber 330. The brewing chamber may be composed of a chamber housing 331 that is preferably configured to readily facilitate the removal and replacement of a filter system 333. In one embodiment, the chamber housing 331 is of a size slightly larger in dimensions than the filter system 333 to facilitate a taut and relatively unyielding coupling with one another. In an alternate embodiment, the internal volume of chamber housing 331 is roughly equivalent to that of solute 332 and filter system 333. In other embodiments, the coupling with the housing 331 and filter system 333 may have dimensional variance with one another. The filter system 333 may include a solute 332 that is placed in fluid communication with the solvent 301*a* to facilitate infusion, thereby creating a solution 301*b* (a solvent 301*a*/solute 332 mixture). In fluid communication with the brew chamber 330 is a SPMS 340, which is the operable equivalent to the aforementioned SPMS 240. The SPMS 340 may include a valve 342 and a pressure monitoring device 341, e.g., a pump or valve. The valve 342 is configured to selectively resist flow of the solution 301*b* out of the brew chamber 330, advantageously modulating the infusion pressure within brew chamber 330. After the solution 301*b* passes through the valve 342 it exits the brewing system 300 to a removable cup 350 or an operable equivalent.

As will be obvious to those skilled in the art, the configuration of brewing system 300 should take into account potential cavitations within said brewing system 300 which may diminish the performance of said brewing system. Thus it may be advantageous to configure said system 300 such that the solvent 301*a* and 301 are under constant positive pressure.

The control system 380, which may be an operable equivalent to the control system 280 described and shown with reference to FIG. 2, is adapted to the brewing system 300 to be communicatively coupled to one or more devices in the system 300. The control system 380 may modulate the performance of the SFMS 310, the STMS 320, and the SPMS 340 to ensure that the user's specifications for an extraction manifested during the infusion or dispensing of the solvent 301*a*.

Figure 4:
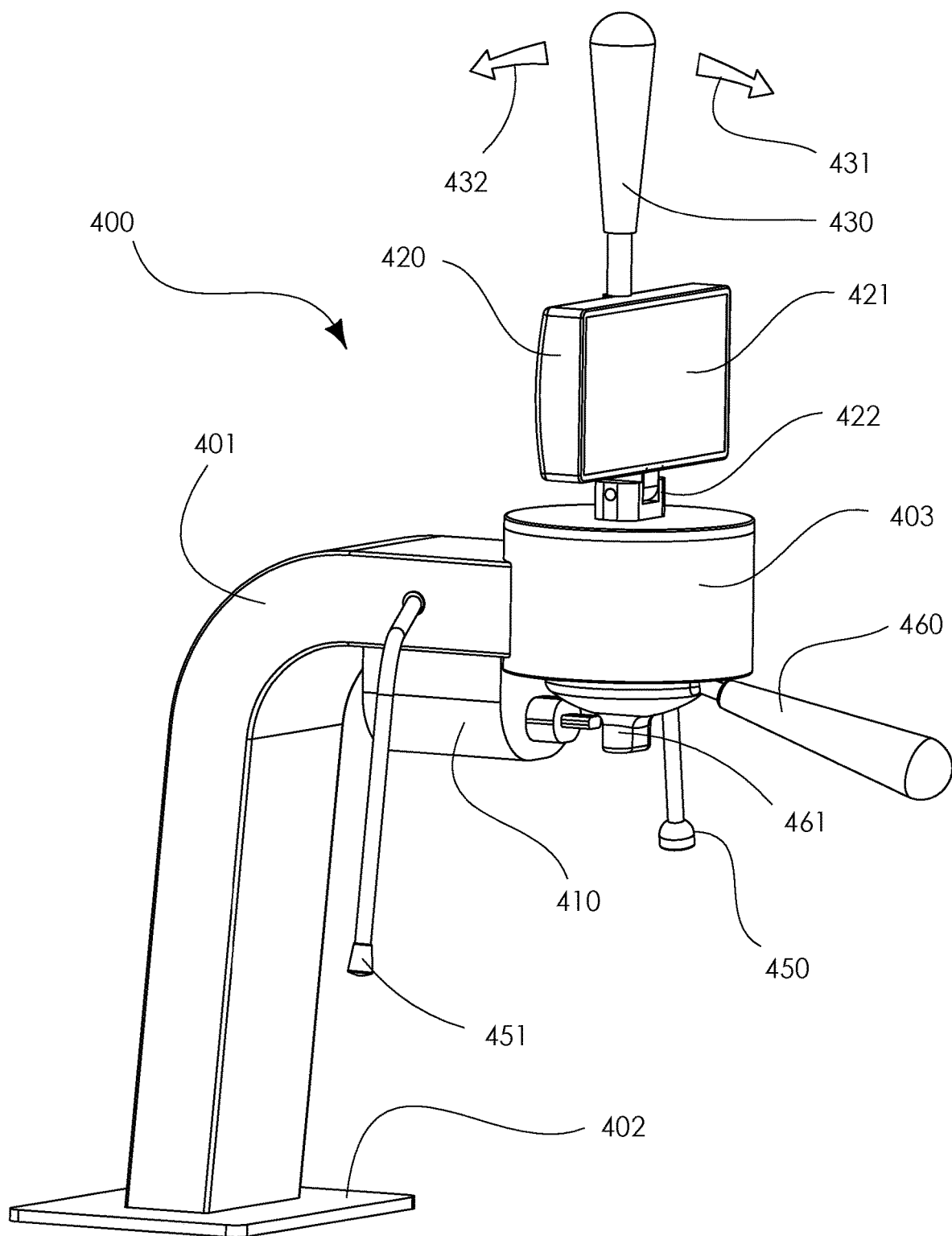
FIG. 4 is a fragmentary perspective view of an independently controlled beverage brewing device in accordance with an embodiment of the present invention.

One benefit of the disclosed beverage brewing system 300 is the ability to substantially separate the brewing chamber 330 from the STMS 320 and SPMS 340 without adverse effects on infused solution quality. A system of the aforementioned configuration is preferably configure such that solvent 301*a* is produced proximate brewing chamber 330 thereby ensuring an accurate infusion temperature regardless brew chamber 330 to STMS 320 and SPMS 340 separation distance. Said separation preferably enables the minimization of the overall appearance of the beverage brewing system 300 to the viewing public, including the user. In practice, one methodology of minimizing brewing system appearance is positioning the STMS 320 and the SFMS 310 out of the user's view with the SPMS and brewing chamber 330 visible. FIG. 4 depicts an exemplary embodiment of the visible portion of the aforementioned visually minimized system.

FIG. 4 depicts a visible brewing component 400 that may include a mechanical support 401 with a platform mounting plate 402. The visible brewing component 400 may include a brew chamber 403, which is an operable equivalent of the brew chamber 330 described and shown in reference to FIG. 3. The component 400 also includes a SPMS 410, which is also an operable equivalent of the SPMS 340 described and shown in reference to FIG. 3. The component 400 may also include a steam dispensing nozzle 451 and a dispensing spout 450 which are also operable equivalents to those comparable components described and shown in reference to FIG. 3.

The component 400, which may also be referred to as a body, may also include a user interface 421 housed in a user interface housing 420 that is preferably made in operable attachment to mechanical support 401 by hinge support 422 which may be configured to facilitate rotation about said hinge of an interface housing 420 indicated by a directional indicator 431 or reverse rotation indicated by a directional indicator 432. An interface housing control lever 430 may be attached to interface housing 420 thereby aiding in the selective movement. A sensor means (not shown) may be utilized to detect motion of interface housing 420 about hinge support 422 which may be utilized to selectively activate components of said beverage brewing system. An exemplary use of said switching means is the actuation of steam dispensing valve (not shown) facilitating the dispensing of steam from steam dispensing nozzle 451. Said dispensing may be initiated by movement in one direction resulting in manually controlled steam dispensing and movement in the other direction initiating an automated dispensing of steam that may be controlled with respect to temperature rise of a frothed beverage.

The brew chamber 403 is configured to contain a filter system (not shown) within a removable filter housing 461, both of which may be operable in an equivalent above-described manner. The filter housing 461 preferably has a filter system handle 460 attached thereto, which is configured to aid in its removal and replacement. In operable engagement with removable filter housing 461 is the SPMS 410 which is configured to modulate infusion pressure as described above.

Figure 5:
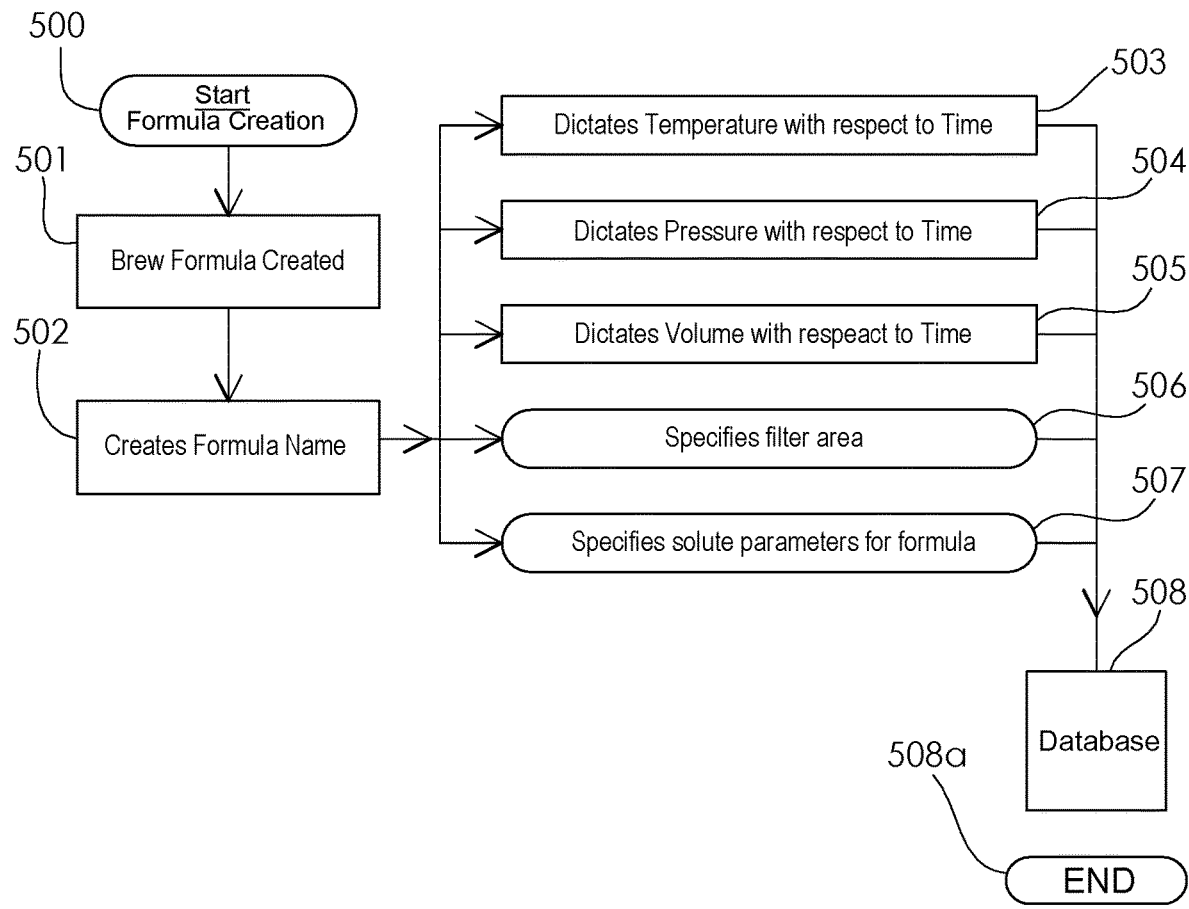
FIG. 5 is a process flow diagram depicting an exemplary process of programming the beverage brewing system of FIG. 1 in accordance with one embodiment of the present invention.

FIG. 5 depicts a process flow diagram for the present invention. The process of brew formula creation begins in step 500. Step 501 is the initialization of the brew formula creation mechanism. In this step the user will access software or alternate means of creating said brew formula. In step 502, a formula name is created, preferably, said name is unique, distinctive and indicative of the solute to be used to create said brew. Steps 503-507 specify the brew parameters. In step 503 the temperature with respect to time is preferably specified. In step 504, the pressure is preferably dictated with respect to time, and in step 505 the volume is specified with respect to time. As will be understood by those skilled in the art, the aforementioned brew parameters may be specified with respect to other parameters as long as the parameters of temperature, solution flow rate and infusion pressure are specified. Additionally, said brew formula may include step 506, the specification of filter area, and step 507, the specification of solute parameters. Said solute parameters may include average solute particle size, compaction and any other pertinent information which may be useful to an operator when executing the brew formula. In step 508, the aforementioned parameters are stored in a storage media known as a database. The process of brew formula creation is complete at step 508a.

Figure 6:
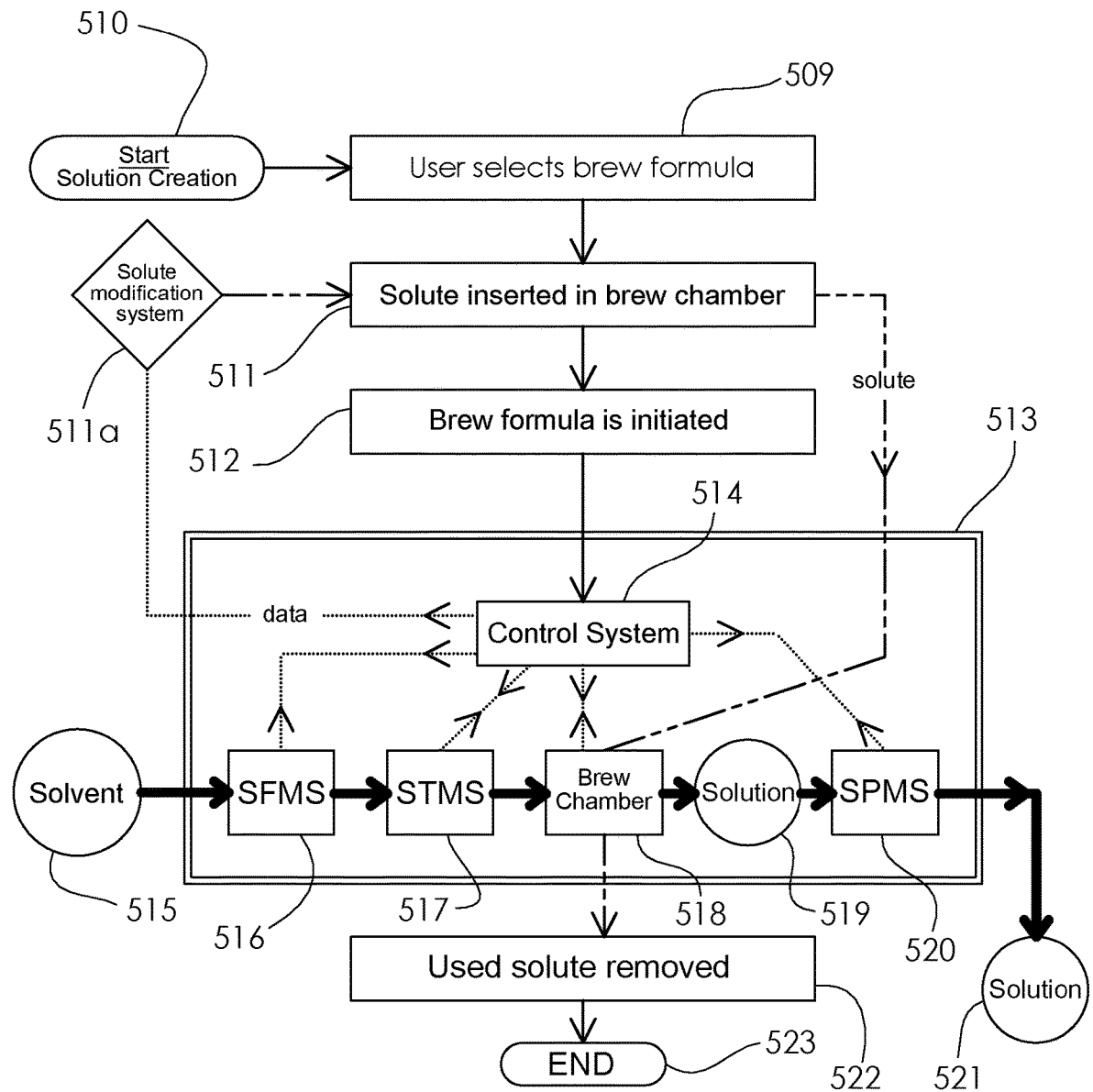
FIG. 6 is a process flow diagram depicting an exemplary process of operating the beverage brewing system of FIG. 1 in accordance with one embodiment of the present invention.

With reference now to FIG. 6, a process flow diagram depicting an exemplary process of operating the beverage brewing system is shown. Electing to brew a beverage, a user starts at step 510. In step 509, a brewing formula is selected by the user. During step 511a solute is modified to the appropriate size based by a solute modification system according to a user's desires and/or information provided from a communicatively coupled control system 160. During step 511 the solute is inserted in brewing/infusion chamber 130. Subsequently, brew formula execution is initiated in step 512. In step 514, a signal is sent to the control system 160 of the brewing device 513 which is the operable equivalent to brewing device 100. In Step 515, the control system 160 causes solvent to enter brewing device 513. During step 516, the SFMS 110, 210, 310, receives a control signal from control system 160, causing flow of solvent at a rate dictated by the chosen brew formula. During step 517, the STMS 120 receives a control signal from the control system 160 and thermally modulates the solvent in accordance with the brew formula. The infusion of solvent and solute within brew chamber 130 occurs during step 518. During step 519, the infused solution/beverage exits from said brewing chamber 130. During step 520, the solution traverses through the SPMS 140, which receives a control signal from the control system 160, resulting in pressure regulation during the infusion process. During step 521, solution exits brewing device 513.

As will be obvious to those skilled in the art, steps 516, 517, 518, 519, 520 may all occur concurrently. At the conclusion of step 521, the removal of used solute from brewing chamber 130, occurs during step 522. After solute removal, the process concludes at step 523.

The SFMS 110, 210, 310 is a system of moving fluid that provides accurate, metered, variable flow of solvent thought the brewing system. Applicable systems may include a pumping means capable of providing flow at pressures and rates equal to or greater than those required by the brewer. Exemplary pumps are preferably volumetric in operation however, gear pumps, piston pumps, rotary vane pumps or any others that satisfy the aforementioned criteria. Pumping means is preferably in operable connection with a solvent flow meter(s) or an equivalent mechanism that acts as a feedback mechanism ensuring the desired flow rate and volume is dispensed. Preferably, pumping is performed by a pump with 100% volumetric efficiency driven by a prime mover with feedback and/or position control such as a servo or stepper motors whereby the use of a flow meter is not required to achieve accurate flow rates. Additionally, the pumping means is capable of modulating and maintaining the required fluid flow rate during the brewing process regardless of system pressure. SFMS may be a self-controlled system or coupled to an external system controller that monitors and modulates performance.

The STMS, 120, 220, 320 is a system for providing rapidly variable, accurate and precise temperature solvent to the brewing chamber. Exemplary systems include instant or tankless solvent heating systems and the use of thermostatic mixing valves/systems. Regardless of the system utilized, an ideal STMS is capable of providing variations in temperature that are equal to or greater than those desired by the operator. Ideal STMS have the ability to provide solvent temperature modulations at a rate of at least 10° C./sec or 10° C./mL flow that contacts solute and provide a minimum accuracy of +/−3° C. during the infusion. An optimal system takes into account specific heat capacity and thermal conductivity of solvent conduits in operable connection to solute material when delivering solvent.

An ideal brewing chamber 130, 230, 330 is a system that is operably connected to the SFMS, STMS, and SPMS. It includes a chamber configured to facilitate contact of solution and solute creating an infused solution, selectively contain solute media, and allow said infused solution to exit said brew chamber. An ideal brewing chamber has a minimal specific heat capacity and thermal conductivity such that infusion temperature can be rapidly modified. Preferably it is configured such that the material contacting solvent has a thermal conductivity at or below 1 W/m*K, exemplary materials include the class of polymers of Polyetherimide (PEI) and polyetheretherketone (PEEK). Additionally, said brewing chamber is capable of withstanding pressures greater than those provided by the brewing system.

Operably connected to brewing chamber is a SPMS, 140, 240, 340, that modulates the pressure within said brewing chamber by modifying infused solution flow resistance. The SPMS may include a pressure measuring device operably connected to solute within brew chamber and a valve that is capable of modulating infused solution flow resistance thus increasing pressure within brewing chamber. Exemplary valves include pressure regulators, needle, butterfly, globe and pinch valves or any other flow regulating device capable of regulating pressure within brew chamber. Ideal valves are impervious to particulate matter, oils, and other dissolved solids that may exist in infused solution. Furthermore, SPMS optimally contains a minimal internal volume and adjusts pressure within the chamber to an accuracy of at least +/−0.5 Bar and a minimum rate of pressure change greater than 1 Bar/sec. Additionally the internal volume should be readily cleaned.

An electronic control system 160, 280, 380, is ideally used to selectively modulate and monitor performance of SFMS, STMS, and SPMS during the infusion process. Additionally, the control system is able to be pre-programmed with brewing "formulas" that may be tailored to different personal preferences and solute. These formulas may be recalled when desired thus minimizing the amount of labor, skill and time required to reproduce brewing results. The control system may include networking capabilities such as being connected to the Internet, thereby enabling remote system monitoring and transmission of brewing "formulas" to the brewing system. Preferably, the said control system will be capable of processing a multitude of user imputed variables to create an executable extraction. Said variables include pressure, flow rate, temperature, overall time, and dispensed volume.

As will be obvious to those skilled in the art, the variables of flow rate, infusion time and dispensed infusion volume are not all independent variables, thus, the control system is preferably capable of affording the user the ability to select the two independent variables desired. For instance, the user may elect to dictate infusion flow rate with respect to infusion time thus making dispensed volume the dependent variable. Alternately, the user may elect to dictate dispensed volume with respect to time making flow rate a dependent variable determined by the control system.

Furthermore, the said control system is preferably capable of enabling the user to dynamically (i.e., during the brewing process) modify all the brew variables with respect to the other variables. For instance, the user may decide to dictate the variable of temperature with respect to pressure, time, or volume. Likewise, the pressure may be dictated with respect to time or volume or temperature. However, for the sake of simplicity, it is preferable for all the variables to be dictated with respect to the same parameter of either time or dispensed volume with absolute limits and rates of change governed by the capabilities of the STMS, SFMS, brew chamber, and SPMS. In the event that the feedback mechanisms indicate that the actual infusion deviated from any of the set values of the brew formula, an error message is preferably generated communicating the error to the user whereby the user may modify the brew formula or modify solute and or filter media to enable the brewing system to successfully execute the brew formula.

In the event that a brew formula is generated for a set volume and the user desires to increase the volume of solution brewed while maintaining the effective brew parameters, the control system is preferably capable of taking the original brew formula and modulating the dispensed flow rate in a temporary fashion thus, keeping total time constant, and also recommending an increase in filter media size to ensure the increased infusion volume is of consistent flavor with the original brew formula.

Benefits of the aforementioned system may be derived from inclusion of less than all three solution control systems: SFMS, STMS and SPMS. For instance a beverage brewing system may include a STMS and SFMS or an alternate configuration may include a SFMS and SPMS operably connected to a brewing chamber.

In this embodiment, flow rate of solvent is dictated and modified by the SFMS, temperature of solvent is modulated and controlled by the STMS and the pressure within the brewing chamber is modified by the SPMS. All of the aforementioned brewing variables are able to be independently varied by the user during the infusion. Additionally, due to the complexity of the aforementioned systems, it may be found advantageous to utilize a programmable controller to control and modify the aforementioned brewing variables of said brewing system.

While the disclosed beverage brewing/infusion system mitigates the impact effect variances in solute size and solute compaction have on the infusion flavor, it may be found useful to utilize data recorded by the control system to modify solute parameters such as solute size or solute compaction. The may be accomplished through a solute modification system, which may include a solute grinder and/or compaction tool operably connected with the brewing chamber where the solute is disposed. In one exemplary system, a control system, as described above, is communicatively coupled to a solute modification system, specifically a solute grinder, whereby sensor data from an infusion process may be utilized to modify performance of said grinder to improve the performance of the total system. One such example is utilizing pressure sensor data during an infusion process to modify the performance of a grinder to produce smaller or larger solute in order to ensure a consistent beverage flavor.

For instance, if a beverage is brewed/infused utilizing a formula and the SPMS 140, 240, 340 is unable to produce the pressure profile specified by the formula or SPMS requires excessive or inordinate levels of flow modulation, the control system may communicate with a solute grinder causing it to reduce or increase or decrease the size of solute disposed within the brew chamber. As will be obvious, assuming the same level of solute compaction and solute mass, a decrease in average solute particle size will result in higher solute resistance and an increase in average solute particle size will result in decreased resistance enabling lower infusion pressures. Likewise, the system may be configured to utilize control system data to modify solute compaction rather than average solute particle size.

What is claimed is:

1. An infused beverage brewing assembly comprising:
   a solvent flow management system with at least one solvent pump operably configured to receive a solvent and induce a flow of the solvent through a first solvent conduit and a second solvent conduit;
   a solvent temperature modulation system in fluid communication with the solvent flow management system and operably configured to thermally modulate the solvent disposed within the first solvent conduit to a raised temperature higher and different than a temperature of the solvent disposed within the second solvent conduit, the first and second solvent conduits directly coupled together to form a conduit joint downstream of the solvent temperature modulation system to form a resulting solvent conduit with a resulting solvent disposed therein at a resulting temperature;
   a brewing chamber in fluid communication with the resulting solvent conduit and for housing a solute disposed to receive the resulting solvent to produce an infused beverage;
   an outlet for discharging the infused beverage; and
   a resulting solvent valve disposed upstream of the brewing chamber, downstream of the conduit joint, and in fluid communication with the solvent conduit, the valve operably configured to selectively have a closed state inhibiting flow of the resulting solvent to the brewing chamber and an active state that includes a first selective directional flow path directing the flow of the resulting solvent to a removal conduit without passing the resulting solvent through the brewing chamber and a second selective directional flow path directing the flow of the resulting solvent to the brewing chamber, thereby enabling resulting solvent delivered to the brewing chamber at a desired temperature.

2. The infused beverage brewing assembly according to claim 1, wherein the solvent flow management system further comprises:
   a first solvent pump fluidly coupled to the first solvent conduit and operably configured to receive the solvent and induce the flow of the solvent therethrough; and
   a second solvent pump fluidly coupled to the second solvent conduit and operably configured to receive the solvent and induce the flow of the solvent therethrough.

3. The infused beverage brewing assembly according to claim 1, further comprising:
   a temperature measuring device coupled to and in fluid communication with the resulting solvent conduit and operably configured to measure the resulting solvent temperature and communicate the resulting solvent temperature to an electronic controller.

4. The infused beverage brewing assembly according to claim 3, wherein:
   the electronic controller communicatively is coupled to the solvent temperature modulation system, the valve, the temperature measuring device, the electronic controller operably configured to at least one of dynamically modulate the solvent temperature modulation system and selectively maintain the valve in the first selective directional flow path of the active state until the desired temperature of the resulting solvent is ascertained by the temperature measuring device, the electronic controller selectively switching from the first selective directional flow path of the active state to the second selective directional flow path of the active state.

5. The infused beverage brewing assembly according to claim 4, wherein:
the resulting solvent valve is disposed downstream of the conduit joint, the first solvent conduit having a temperature measuring device coupled thereto, in fluid communication therewith downstream of the solvent temperature management system, and communicatively coupled to the electronic controller, the electronic controller operably configured to send a control signal to the solvent temperature management system to dynamically and thermally modulate the solvent disposed within the first solvent conduit to the raised temperature when receiving a temperature from the temperature measuring device coupled to the first solvent conduit.

6. The infused beverage brewing assembly according to claim 4, wherein:
the desired temperature is greater than the resulting solvent temperature.

7. The infused beverage brewing assembly according to claim 6, wherein:
the solvent temperature modulation system is a heating exchanging container having a heating element and solvent disposed therein.

8. The infused beverage brewing assembly according to claim 7, wherein:
the removal conduit spans from the resulting solvent valve to the heating exchanging container to form a recirculation conduit, the recirculation conduit having a recirculation pump fluidly coupled thereto and operably configured to induce a flow of the resulting solvent to the heating exchanging container.

9. The infused beverage brewing assembly according to claim 1, further comprising:
an electronic controller operably configured to send a control signal to the solvent temperature management system to dynamically and thermally modulate the solvent disposed within the first solvent conduit with respect to a brew parameter that includes at least one of an overall time and dispensed volume of the infused beverage.

10. The infused beverage brewing assembly according to claim 1, further comprising:
a unitary visible brewing component having a mounting plate operably configured to directly couple a support surface, a mechanical support extending upwardly away from the mounting plate, and the brewing chamber and a steam dispensing nozzle coupled to the mechanical support.

11. An infused beverage brewing assembly comprising:
a solvent flow management system with at least one solvent pump operably configured to receive a solvent and induce a flow of the solvent through at least one solvent conduit having a first solvent conduit and a second solvent conduit;
a solvent temperature modulation system in fluid communication with the solvent flow management system and operably configured to thermally modulate the solvent disposed within the at least one solvent conduit to a raised temperature;
a brewing chamber in fluid communication with the at least one solvent conduit and for housing a solute disposed to receive the solvent to produce an infused beverage;
an outlet for discharging the infused beverage; and
an electronic controller communicatively coupled to the solvent temperature modulation system and operably configured to send a control signal to the solvent temperature management system to dynamically and thermally modulate the solvent disposed within the first solvent conduit to a raised temperature when receiving a temperature from a temperature measuring device fluidly coupled to at least one of the first solvent conduit downstream of the solvent temperature modulation system and a resulting solvent conduit and a conduit joint formed by the first and second solvent conduits directly coupling together, the resulting solvent conduit with a resulting solvent disposed therein at a resulting temperature and the temperature measuring device fluidly coupled upstream of the brewing chamber.

12. The infused beverage brewing assembly according to claim 11, wherein
the electronic controller is operably configured to send a control signal to the solvent flow management system to thermally modulate the solvent disposed within the first solvent conduit to a raised temperature higher and different than a temperature of the solvent disposed within the second solvent conduit.

13. The infused beverage brewing assembly according to claim 12, wherein
the electronic controller is operably configured to send a control signal to the solvent temperature management system to dynamically and thermally modulate the solvent disposed within the first solvent conduit with respect to a brew parameter that includes at least one of an overall time and dispensed volume of the infused beverage.

14. The infused beverage brewing assembly according to claim 12, further comprising:
a resulting solvent valve disposed upstream of the brewing chamber, downstream of the conduit joint, and in fluid communication with the resulting solvent conduit, the valve operably configured to selectively have a closed state inhibiting flow of the resulting solvent to the brewing chamber and an active state that includes a first selective directional flow path directing the flow of the resulting solvent to a removal conduit without passing the resulting solvent through the brewing chamber and a second selective directional flow path directing the flow of the resulting solvent to the brewing chamber, thereby enabling resulting solvent delivered to the brewing chamber at a desired temperature.

15. The infused beverage brewing assembly according to claim 14, wherein:
the temperature measuring device is coupled to and in fluid communication with the resulting solvent conduit and operably configured to measure the resulting solvent temperature and communicate the resulting solvent temperature to the electronic controller.

16. The infused beverage brewing assembly according to claim 15, wherein:
the electronic controller communicatively is coupled to the solvent temperature modulation system, the valve, the temperature measuring device, the electronic controller operably configured to at least one of dynamically modulate the solvent temperature modulation system and selectively maintain the valve in the first selective directional flow path of the active state until the desired temperature of the resulting solvent is ascertained by the temperature measuring device, the electronic controller selectively switching from the first selective directional flow path of the active state to the second selective directional flow path of the active state.

* * * * *

Disclaimer

10,772,456 B2 - Gideon Duvall, Atlanta, GA (US). DEVICE AND SYSTEM FOR BREWING INFUSED BEVERAGES. Patent dated September 15, 2020. Disclaimer filed February 3, 2025, by the assignee, DUVALL ESPRESSO IP ENFORCEMENT, LLC.

I hereby disclaim the following complete Claims 11-16 of said patent.

*(Official Gazette, May 6, 2025)*